(12) United States Patent
Srinivasan et al.

(10) Patent No.: US 8,121,830 B2
(45) Date of Patent: Feb. 21, 2012

(54) METHODS AND APPARATUS TO EXTRACT DATA ENCODED IN MEDIA CONTENT

(75) Inventors: Venugopal Srinivasan, Palm Harbor, FL (US); Alexander Pavlovich Topchy, New Port Richey, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 306 days.

(21) Appl. No.: 12/604,176

(22) Filed: Oct. 22, 2009

(65) Prior Publication Data

US 2010/0106718 A1  Apr. 29, 2010

Related U.S. Application Data

(60) Provisional application No. 61/108,380, filed on Oct. 24, 2008.

(51) Int. Cl.
*G10L 19/14* (2006.01)
(52) U.S. Cl. ........ 704/205; 308/236; 712/208; 714/746; 700/94; 381/22; 455/412.1; 704/201; 704/500; 341/155; 707/661; 707/736; 707/758
(58) Field of Classification Search .................. None
See application file for complete search history.

(56) References Cited

U.S. PATENT DOCUMENTS

| | | | |
|---|---|---|---|
| 4,230,990 A | 10/1980 | Lert, Jr. et al. | |
| 4,647,974 A | 3/1987 | Butler et al. | |
| 4,677,466 A | 6/1987 | Lert, Jr. et al. | |
| 4,697,209 A | 9/1987 | Kiewit et al. | |
| 4,745,468 A | 5/1988 | Von Kohorn | |
| 4,876,592 A | 10/1989 | Von Kohorn | |
| 4,876,736 A | 10/1989 | Kiewit | |
| 4,926,255 A | 5/1990 | Von Kohorn | |
| 4,973,952 A | 11/1990 | Malec et al. | |
| 5,019,899 A | 5/1991 | Boles et al. | |
| 5,023,929 A | 6/1991 | Call | |
| 5,034,807 A | 7/1991 | Von Kohorn | |

(Continued)

FOREIGN PATENT DOCUMENTS

AU  8976601  2/2002

(Continued)

OTHER PUBLICATIONS

International Search Report, issued in PCT/US2009/061827, mailed Mar. 15, 2010, 4 pages.

(Continued)

*Primary Examiner* — Hung Le
(74) *Attorney, Agent, or Firm* — Hanley, Flight & Zimmerman, LLC.

(57) ABSTRACT

Methods and apparatus to extract data encoded in media content are disclosed. An example method includes receiving a media content signal, sampling the media content signal to generate digital samples, determining a frequency domain representation of the digital samples, determining a first rank of a first frequency in the frequency domain representation, determining a second rank of a second frequency in the frequency domain representation, combining the first rank and the second rank with a set of ranks to create a combined set of ranks, comparing the combined set of ranks to a set of reference sequences, determining a data represented by the combined set of ranks based on the comparison, and storing the data in a tangible memory.

21 Claims, 7 Drawing Sheets

U.S. PATENT DOCUMENTS

| | | | |
|---|---|---|---|
| 5,057,915 A | 10/1991 | Von Kohorn | |
| 5,081,680 A | 1/1992 | Bennett | |
| 5,128,752 A | 7/1992 | Von Kohorn | |
| 5,227,874 A | 7/1993 | Von Kohorn | |
| 5,249,044 A | 9/1993 | Von Kohorn | |
| 5,283,734 A | 2/1994 | Von Kohorn | |
| 5,331,544 A | 7/1994 | Lu et al. | |
| 5,401,946 A | 3/1995 | Weinblatt | |
| 5,425,100 A | 6/1995 | Thomas et al. | |
| 5,450,490 A * | 9/1995 | Jensen et al. | 380/253 |
| 5,481,294 A | 1/1996 | Thomas et al. | |
| 5,512,933 A | 4/1996 | Wheatley et al. | |
| 5,524,195 A | 6/1996 | Clanton, III et al. | |
| 5,543,856 A | 8/1996 | Rosser et al. | |
| 5,574,962 A | 11/1996 | Fardeau et al. | |
| 5,579,124 A | 11/1996 | Aijala et al. | |
| 5,594,934 A | 1/1997 | Lu et al. | |
| 5,629,739 A | 5/1997 | Dougherty | |
| 5,659,366 A | 8/1997 | Kerman | |
| 5,666,293 A | 9/1997 | Metz et al. | |
| 5,719,634 A | 2/1998 | Keery et al. | |
| 5,734,413 A | 3/1998 | Lappington et al. | |
| 5,740,035 A | 4/1998 | Cohen et al. | |
| 5,815,671 A | 9/1998 | Morrison | |
| 5,841,978 A | 11/1998 | Rhoads | |
| 5,848,155 A | 12/1998 | Cox | |
| 5,850,249 A | 12/1998 | Massetti et al. | |
| 5,872,588 A | 2/1999 | Aras et al. | |
| 5,880,789 A | 3/1999 | Inaba | |
| 5,893,067 A | 4/1999 | Bender et al. | |
| 5,918,223 A | 6/1999 | Blum et al. | |
| 5,930,369 A | 7/1999 | Cox et al. | |
| 5,933,789 A | 8/1999 | Byun et al. | |
| 5,956,674 A * | 9/1999 | Smyth et al. | 704/200.1 |
| 5,956,716 A | 9/1999 | Kenner et al. | |
| 5,966,120 A | 10/1999 | Arazi et al. | |
| 5,974,380 A * | 10/1999 | Smyth et al. | 704/229 |
| 5,974,396 A | 10/1999 | Anderson et al. | |
| 5,987,855 A | 11/1999 | Dey et al. | |
| 6,034,722 A | 3/2000 | Viney et al. | |
| 6,049,830 A | 4/2000 | Saib | |
| 6,055,573 A | 4/2000 | Gardenswartz et al. | |
| 6,128,597 A * | 10/2000 | Kolluru et al. | 704/500 |
| 6,154,209 A | 11/2000 | Naughton et al. | |
| 6,208,735 B1 | 3/2001 | Cox et al. | |
| 6,216,129 B1 | 4/2001 | Eldering | |
| 6,286,036 B1 | 9/2001 | Rhoads | |
| 6,286,140 B1 | 9/2001 | Ivanyi | |
| 6,298,348 B1 | 10/2001 | Eldering | |
| 6,300,888 B1 * | 10/2001 | Chen et al. | 341/63 |
| 6,308,327 B1 | 10/2001 | Liu et al. | |
| 6,331,876 B1 | 12/2001 | Koster et al. | |
| 6,335,736 B1 | 1/2002 | Wagner et al. | |
| 6,363,159 B1 | 3/2002 | Rhoads | |
| 6,389,055 B1 | 5/2002 | August et al. | |
| 6,400,827 B1 | 6/2002 | Rhoads | |
| 6,411,725 B1 | 6/2002 | Rhoads | |
| 6,421,445 B1 * | 7/2002 | Jensen et al. | 380/253 |
| 6,487,564 B1 | 11/2002 | Asai et al. | |
| 6,505,160 B1 | 1/2003 | Levy et al. | |
| 6,512,836 B1 | 1/2003 | Xie et al. | |
| 6,513,014 B1 | 1/2003 | Walker et al. | |
| 6,522,771 B2 | 2/2003 | Rhoads | |
| 6,539,095 B1 | 3/2003 | Rhoads | |
| 6,546,556 B1 | 4/2003 | Kataoka et al. | |
| 6,553,178 B2 | 4/2003 | Abecassis | |
| 6,642,966 B1 | 11/2003 | Limaye | |
| 6,647,269 B2 | 11/2003 | Hendrey et al. | |
| 6,651,253 B2 | 11/2003 | Dudkiewicz et al. | |
| 6,654,480 B2 | 11/2003 | Rhoads | |
| 6,665,873 B1 | 12/2003 | Van Gestel et al. | |
| 6,675,383 B1 | 1/2004 | Wheeler et al. | |
| 6,683,966 B1 | 1/2004 | Tian et al. | |
| 6,710,815 B1 | 3/2004 | Billmaier et al. | |
| 6,714,683 B1 | 3/2004 | Tian et al. | |
| 6,741,684 B2 | 5/2004 | Kaars | |
| 6,750,985 B2 | 6/2004 | Rhoads | |
| 6,766,523 B2 | 7/2004 | Herley | |
| 6,795,972 B2 | 9/2004 | Rovira | |
| 6,804,379 B2 | 10/2004 | Rhoads | |
| 6,823,310 B2 * | 11/2004 | Ishito et al. | 704/270 |
| 6,829,368 B2 | 12/2004 | Meyer et al. | |
| 6,853,634 B1 | 2/2005 | Davies et al. | |
| 6,871,323 B2 | 3/2005 | Wagner et al. | |
| 6,873,688 B1 | 3/2005 | Aarnio | |
| 6,941,275 B1 | 9/2005 | Swierczek | |
| 6,956,575 B2 | 10/2005 | Nakazawa et al. | |
| 6,968,315 B1 | 11/2005 | Nakisa | |
| 6,968,564 B1 | 11/2005 | Srinivasan | |
| 6,970,886 B1 | 11/2005 | Conwell et al. | |
| 6,996,213 B1 | 2/2006 | De Jong | |
| 7,003,731 B1 | 2/2006 | Rhoads et al. | |
| 7,050,603 B2 | 5/2006 | Rhoads et al. | |
| 7,051,086 B2 | 5/2006 | Rhoads et al. | |
| 7,058,697 B2 | 6/2006 | Rhoads | |
| 7,082,434 B2 | 7/2006 | Gosselin | |
| 7,095,871 B2 | 8/2006 | Jones et al. | |
| 7,143,949 B1 | 12/2006 | Hannigan | |
| 7,158,943 B2 | 1/2007 | Van der Riet | |
| 7,171,018 B2 | 1/2007 | Rhoads et al. | |
| 7,174,293 B2 | 2/2007 | Kenyon et al. | |
| 7,185,201 B2 | 2/2007 | Rhoads et al. | |
| 7,194,752 B1 | 3/2007 | Kenyon et al. | |
| 7,197,156 B1 | 3/2007 | Levy | |
| 7,215,280 B1 | 5/2007 | Percy et al. | |
| 7,221,405 B2 | 5/2007 | Basson et al. | |
| 7,227,972 B2 | 6/2007 | Brundage et al. | |
| 7,254,249 B2 | 8/2007 | Rhoads et al. | |
| 7,273,978 B2 | 9/2007 | Uhle | |
| 7,317,716 B1 | 1/2008 | Boni et al. | |
| 7,328,153 B2 | 2/2008 | Wells et al. | |
| 7,328,160 B2 * | 2/2008 | Nishio et al. | 704/500 |
| 7,346,512 B2 | 3/2008 | Li-Chun Wang et al. | |
| 7,356,700 B2 | 4/2008 | Noridomi et al. | |
| 7,363,278 B2 | 4/2008 | Schmelzer et al. | |
| 7,369,678 B2 | 5/2008 | Rhoads | |
| 7,421,723 B2 | 9/2008 | Harkness et al. | |
| 7,443,292 B2 | 10/2008 | Jensen et al. | |
| 7,463,143 B2 | 12/2008 | Forr et al. | |
| 7,519,658 B1 | 4/2009 | Anglin et al. | |
| 7,592,908 B2 | 9/2009 | Zhang et al. | |
| 7,623,823 B2 | 11/2009 | Zito et al. | |
| 2001/0044899 A1 | 11/2001 | Levy | |
| 2002/0032734 A1 | 3/2002 | Rhoads | |
| 2002/0033842 A1 | 3/2002 | Zetts | |
| 2002/0053078 A1 | 5/2002 | Holtz et al. | |
| 2002/0056094 A1 | 5/2002 | Dureau | |
| 2002/0059218 A1 | 5/2002 | August et al. | |
| 2002/0062382 A1 | 5/2002 | Rhoads et al. | |
| 2002/0091991 A1 | 7/2002 | Castro | |
| 2002/0102993 A1 | 8/2002 | Hendrey et al. | |
| 2002/0108125 A1 | 8/2002 | Joao | |
| 2002/0111934 A1 | 8/2002 | Narayan | |
| 2002/0112002 A1 | 8/2002 | Abato | |
| 2002/0124246 A1 | 9/2002 | Kaminsky et al. | |
| 2002/0144262 A1 | 10/2002 | Plotnick et al. | |
| 2002/0144273 A1 | 10/2002 | Reto | |
| 2002/0162118 A1 | 10/2002 | Levy et al. | |
| 2002/0174425 A1 | 11/2002 | Markel et al. | |
| 2002/0194592 A1 | 12/2002 | Tsuchida et al. | |
| 2003/0021441 A1 | 1/2003 | Levy et al. | |
| 2003/0039465 A1 | 2/2003 | Bjorgan et al. | |
| 2003/0088674 A1 | 5/2003 | Ullman et al. | |
| 2003/0105870 A1 | 6/2003 | Baum | |
| 2003/0108200 A1 | 6/2003 | Sako | |
| 2003/0115598 A1 | 6/2003 | Pantoja | |
| 2003/0177488 A1 | 9/2003 | Smith et al. | |
| 2003/0185232 A1 | 10/2003 | Moore et al. | |
| 2004/0008615 A1 * | 1/2004 | Oh | 370/203 |
| 2004/0037271 A1 | 2/2004 | Liscano et al. | |
| 2004/0038692 A1 | 2/2004 | Muzaffar | |
| 2004/0064319 A1 | 4/2004 | Neuhauser et al. | |
| 2004/0073916 A1 | 4/2004 | Petrovic et al. | |
| 2004/0073951 A1 | 4/2004 | Bae et al. | |
| 2004/0125125 A1 | 7/2004 | Levy | |
| 2004/0128514 A1 | 7/2004 | Rhoads | |
| 2004/0137929 A1 | 7/2004 | Jones et al. | |

| | | | | | | |
|---|---|---|---|---|---|---|
| 2004/0146161 | A1 | 7/2004 | De Jong | CA | 2483104 | 11/2003 |
| 2004/0162720 | A1* | 8/2004 | Jang et al. ............... 704/200.1 | CN | 1592906 | 3/2005 |
| 2004/0199387 | A1 | 10/2004 | Wang et al. | CN | 1647160 | 7/2005 |
| 2005/0028189 | A1 | 2/2005 | Heine et al. | EP | 0769749 | 4/1997 |
| 2005/0033758 | A1 | 2/2005 | Baxter | EP | 1349370 | 10/2003 |
| 2005/0058319 | A1 | 3/2005 | Rhoads et al. | EP | 1406403 | 4/2004 |
| 2005/0086682 | A1 | 4/2005 | Burges et al. | EP | 1307833 | 6/2006 |
| 2005/0144004 | A1 | 6/2005 | Bennett et al. | EP | 1745464 | 10/2007 |
| 2005/0192933 | A1 | 9/2005 | Rhoads et al. | EP | 1704695 | 2/2008 |
| 2005/0216346 | A1 | 9/2005 | Kusumoto et al. | EP | 1504445 | 8/2008 |
| 2005/0234774 | A1 | 10/2005 | Dupree | JP | 2001040322 | 8/2002 |
| 2006/0059277 | A1 | 3/2006 | Zito et al. | JP | 2002247610 | 8/2002 |
| 2006/0095401 | A1 | 5/2006 | Krikorian et al. | WO | 9527349 | 10/1995 |
| 2006/0107195 | A1 | 5/2006 | Ramaswamy et al. | WO | 9702672 | 1/1997 |
| 2006/0107302 | A1 | 5/2006 | Zdepski | WO | WO0004662 | 1/2000 |
| 2006/0136564 | A1 | 6/2006 | Ambrose | WO | 0019699 | 4/2000 |
| 2006/0167747 | A1 | 7/2006 | Goodman et al. | WO | 0119088 | 3/2001 |
| 2006/0168613 | A1 | 7/2006 | Wood et al. | WO | 0124027 | 4/2001 |
| 2006/0221173 | A1 | 10/2006 | Duncan | WO | 0131497 | 5/2001 |
| 2006/0224798 | A1 | 10/2006 | Klein et al. | WO | 0140963 | 6/2001 |
| 2007/0006250 | A1 | 1/2007 | Croy et al. | WO | 0153922 | 7/2001 |
| 2007/0016918 | A1 | 1/2007 | Alcorn et al. | WO | 0175743 | 10/2001 |
| 2007/0055987 | A1 | 3/2007 | Lu et al. | WO | 0191109 | 11/2001 |
| 2007/0110089 | A1 | 5/2007 | Essafi et al. | WO | 0205517 | 1/2002 |
| 2007/0118375 | A1 | 5/2007 | Kenyon et al. | WO | 0215081 | 2/2002 |
| 2007/0124771 | A1 | 5/2007 | Shvadron | WO | 0217591 | 2/2002 |
| 2007/0127717 | A1 | 6/2007 | Herre et al. | WO | WO0211123 | 2/2002 |
| 2007/0129952 | A1 | 6/2007 | Kenyon et al. | WO | 0219625 | 3/2002 |
| 2007/0149114 | A1 | 6/2007 | Danilenko | WO | WO0227600 | 4/2002 |
| 2007/0162927 | A1 | 7/2007 | Ramaswamy et al. | WO | 0237381 | 5/2002 |
| 2007/0198738 | A1 | 8/2007 | Angiolillo et al. | WO | 0245034 | 6/2002 |
| 2007/0201835 | A1 | 8/2007 | Rhoads | WO | 02065305 | 8/2002 |
| 2007/0226760 | A1 | 9/2007 | Neuhauser et al. | WO | 02065318 | 8/2002 |
| 2007/0250310 | A1* | 10/2007 | Sato et al. ................ 704/219 | WO | WO02061652 | 8/2002 |
| 2007/0274523 | A1 | 11/2007 | Rhoads | WO | 02069121 | 9/2002 |
| 2007/0276925 | A1 | 11/2007 | La Joie et al. | WO | WO03009277 | 1/2003 |
| 2007/0276926 | A1 | 11/2007 | La Joie et al. | WO | 03094499 | 11/2003 |
| 2007/0288476 | A1 | 12/2007 | Flanagan, III et al. | WO | WO03091990 | 11/2003 |
| 2007/0294057 | A1 | 12/2007 | Crystal et al. | WO | WO03096337 | 11/2003 |
| 2007/0294132 | A1 | 12/2007 | Zhang et al. | WO | WO2004010352 | 1/2004 |
| 2007/0294705 | A1 | 12/2007 | Gopalakrishnan et al. | WO | WO2004040416 | 5/2004 |
| 2007/0294706 | A1 | 12/2007 | Neuhauser et al. | WO | WO2004040475 | 5/2004 |
| 2008/0028223 | A1 | 1/2008 | Rhoads | WO | 2005025217 | 3/2005 |
| 2008/0040354 | A1 | 2/2008 | Ray et al. | WO | WO2005064885 | 7/2005 |
| 2008/0059160 | A1 | 3/2008 | Saunders et al. | WO | WO2005101243 | 10/2005 |
| 2008/0065507 | A1 | 3/2008 | Morrison et al. | WO | WO2005111998 | 11/2005 |
| 2008/0071530 | A1* | 3/2008 | Ehara ......................... 704/223 | WO | WO2006012241 | 2/2006 |
| 2008/0077956 | A1 | 3/2008 | Morrison et al. | WO | WO2006025797 | 3/2006 |
| 2008/0082510 | A1 | 4/2008 | Wang et al. | WO | WO2007056531 | 5/2007 |
| 2008/0082922 | A1 | 4/2008 | Biniak et al. | WO | WO2007056532 | 5/2007 |
| 2008/0083003 | A1 | 4/2008 | Biniak et al. | WO | WO2008042953 | 4/2008 |
| 2008/0117975 | A1* | 5/2008 | Sasai et al. ............... 375/240.16 | WO | WO2008044664 | 4/2008 |
| 2008/0133223 | A1 | 6/2008 | Son et al. | WO | WO2008045950 | 4/2008 |
| 2008/0137749 | A1 | 6/2008 | Tian et al. | WO | WO2008110002 | 9/2008 |
| 2008/0139182 | A1 | 6/2008 | Levy et al. | WO | WO2008110790 | 9/2008 |
| 2008/0140573 | A1 | 6/2008 | Levy et al. | WO | 2009011206 | 1/2009 |
| 2008/0168503 | A1 | 7/2008 | Sparrell | WO | 2009064561 | 5/2009 |
| 2008/0209491 | A1 | 8/2008 | Hasek | WO | WO2009061651 | 5/2009 |
| 2008/0219496 | A1 | 9/2008 | Tewfik | | | |
| 2008/0235077 | A1 | 9/2008 | Harkness et al. | | | |
| 2008/0292134 | A1* | 11/2008 | Sharma et al. ............ 382/100 | | | |
| 2009/0070408 | A1 | 3/2009 | White | | | |
| 2009/0119723 | A1 | 5/2009 | Tinsman | | | |
| 2009/0150553 | A1 | 6/2009 | Collart et al. | | | |
| 2009/0240505 | A1* | 9/2009 | Villemoes et al. ............ 704/500 | | | |
| 2009/0259325 | A1 | 10/2009 | Topchy et al. | | | |
| 2009/0265214 | A1 | 10/2009 | Jobs et al. | | | |
| 2009/0281815 | A1* | 11/2009 | Zopf ........................... 704/500 | | | |
| 2009/0307061 | A1 | 12/2009 | Monighetti et al. | | | |
| 2009/0307084 | A1 | 12/2009 | Monighetti et al. | | | |
| 2009/0326960 | A1* | 12/2009 | Breebaat .................... 704/500 | | | |
| 2010/0135638 | A1 | 6/2010 | Mio | | | |

FOREIGN PATENT DOCUMENTS

| | | |
|---|---|---|
| AU | 9298201 | 4/2002 |
| AU | 2003230993 | 11/2003 |
| AU | 2006203639 | 9/2006 |
| BR | 0112901 | 6/2003 |
| BR | 0309598 | 2/2005 |

OTHER PUBLICATIONS

Written Opinion of the International Search Report, issued in PCT/US2009/061827, mailed Mar. 15, 2010, 8 pages.

International Search Report, issued in PCT/US2009/061750, mailed Mar. 9, 2010, 3 pages.

Written Opinion of the Search Report, issued in PCT/US2009/061750, mailed Mar. 9, 2010, 7 pages.

International Search Report, issued in PCT/US2009/061749, mailed May 26, 2010, 6 pages.

Written Opinion of the International Search Report, issued in PCT/US2009/061749, mailed May 26, 2010, 9 pages.

International Searching Authority, "International Search Report," issued in connection with counterpart international application No. PCT/US2010/033201, mailed Oct. 1, 2010 (8 pages).

International Searching Authority, "Written Opinion," issued in connection with counterpart international application No. PCT/US2010/033201, mailed Oct. 1, 2010 (8 pages).-

Patent Cooperation Treaty, International Preliminary Report on Patentability and Written Opinion, for corresponding application No. PCT/US2009/061827, issued on Apr. 26, 2011, 9 pages.

Patent Cooperation Treaty, International Preliminary Report on Patentability and Written Opinion, for corresponding application No. PCT/US2009/061749, issued on May 5, 2011, 10 pages.

Patent Cooperation Treaty, International Preliminary Report on Patentability and Written Opinion, for corresponding application No. PCT/US2009/061750, issued on Apr. 26, 2011, 8 pages.

Fink et al., "Social- and Interactive-Television Applications Based on Real-Time Ambient-Audio Identification," EuroITV, 2006 (10 pages).

Claburn, "Google Researchers Propose TV Monitoring," Information Week, Jun. 7, 2006 (3 pages).

Anderson, "Google to compete with Nielsen for TV-ratings info?," Ars Technica, Jun. 19, 2006 (2 pages).

"What is Jacked?," http://www.jacked.com/, retrieved on Dec. 3, 2009 (1 page).

Sullivan, "Google Cozies Up to SMBs for Digital Content," MediaPost News, Mar. 18, 2009, (2 pages).

Wang, "An Industrial-Strength Audio Search Algorithm," Shazam Entertainment, Ltd., in Proceedings of the Fourth International Conference on Music Information Retrieval, Baltimore, Oct. 26-30, 2003 (7 pages).

Boehret, "Yahoo Widgets Lend Brains to Boob Tube," The Wall Street Journal, Mar. 25, 2009 (3 pages).

Stross, "Apple Wouldn't Rist Its Cool Over a Gimmick, Would It?," The New York Times, Nov. 14, 2009 (3 pages).

Stultz, "Handheld Captioning at Disney World Theme Parks," article retrieved on Mar. 19, 2009, http://goflorida.about.com/od/disneyworld/a/wdw_captioning.htm, (2 pages).

Kane, "Entrepreneur Plans On-Demand Videogame Service," The Wall Street Journal, Mar. 24, 2009 (2 pages).

Shazam, "Shazam turns up the volume on mobile music," http://www.shazam.com/music/web/newsdetail.html?nid=NEWS137, Nov. 28, 2007 (1 page).

Shazam, "Shazam and VidZone Digital Media announce UK1s first fixed price mobile download service for music videos," http://www.shazam.com/music/web/newsdetail.html?nid=NEWS136, Feb. 11, 2008 (1 page).

Shazam, "Shazam launches new music application for Facebook fans," http://www.shazam.com/music/web/newsdetail.html?nid=NEWS135, Feb. 18, 2008 (1 page).

International Searching Authority, "International Search Report and Written Opinion," issued in connection with PCT Application Serial No. PCT/US05/26426, mailed Aug. 18, 2006 (10 pages).

International Bureau, "International Preliminary Report on Patentability," issued in connection with PCT Application Serial No. PCT/US05/26426, issued Jan. 23, 2007 (9 pages).

Canadian Intellectual Property Office, "Office Action," issued in connection with CA Application Serial No. 2,574,998, mailed Aug. 26, 2008 (4 pages).

Canadian Intellectual Property Office, "Office Action," issued in connection with CA Application Serial No. 2,574,998, mailed Mar. 23, 2009 (5 pages).

Canadian Intellectual Property Office, "Office Action," issued in connection with CA Application Serial No. 2,574,998, mailed Nov. 13, 2009 (10 pages).

U.S. Patent and Trademark Office, "Non-final Office Action," issued in connection with U.S. Appl. No. 11/618,245, mailed Feb. 5, 2009 (35 pages).

U.S. Patent and Trademark Office, "Final Office Action," issued in connection with U.S. Appl. No. 11/618,245, mailed Jul. 21, 2009 (26 pages).

U.S. Patent and Trademark Office, "Advisory Action," issued in connection with U.S. Appl. No. 11/618,245, mailed Sep. 30, 2009 (3 pages).

Heuer, et al., "Adaptive Multimedia Messaging based on MPEG-7—The M3-Box," Nov. 9-10, 2000, Proc. Second Int'l Symposium on Mobile Multimedia Systems Applications, pp. 6-13 (8 pages).

Wactlar et al., "Digital Video Archives: Managing Through Metadata" Building a National Strategy for Digital Preservation: Issues in Digital Media Archiving, Apr. 2002, pp. 84-88. [http://www.informedia.cs.cmu.edu/documents/Wactlar-CLIR-final.pdf, retrieved on Jul. 20, 2006] (14 pages).

Mulder, "The Integration of Metadata From Production to Consumer," EBU Technical Review, Sep. 2000, pp. 1-5. [http://www.ebu.ch/en/technical/trev/trev_284-contents.html, retrieved on Jul. 20, 2006] (5 pages).

Hopper, "EBU Project Group P/META Metadata Exchange Standards," EBU Technical Review, Sep. 2000, pp. 1-24. [http://www.ebu.ch/en/technical/trev/trev_284-contents.html, retrieved on Jul. 20, 2006] (24 pages).

Evain, "TV-Anytime Metadata—A Preliminary Specification on Schedule!," EBU Technical Review, Sep. 2000, pp. 1-14. [http://www.ebu.ch/en/technical/trev/trev_284-contents.html, retrieved on Jul. 20, 2006] (14 pages).

"EBU Technical Review (Editorial)," No. 284 Sep. 2000, pp. 1-3. [http://www.ebu.ch/en/technical/trev/trev_284-contents.html, retrieved on Jul. 20, 2006] (3 pages).

International Preliminary Examing Authority, "International Preliminary Examination Report," issued in connection with PCT Application Serial No. PCT/US03/31180, mailed Aug. 17, 2004 (4 pages).

International Searching Authority, "International Search Report," issued in connection with PCT Application Serial No. PCT/US03/31180, mailed Jun. 8, 2004 (5 pages).

U.S. Patent and Trademark Office, "Non-final Office Action," issued in connection with U.S. Appl. No. 10/530,233, mailed Sep. 16, 2009 (8 pages).

U.S. Patent and Trademark Office, "Final Office Action," issued in connection with U.S. Appl. No. 10/530,233, mailed Mar. 18, 2010 (9 pages).

* cited by examiner

METHODS AND APPARATUS TO EXTRACT DATA ENCODED IN MEDIA CONTENT

RELATED APPLICATIONS

This patent is a non-provisional patent application of U.S. Provisional Patent Application Ser. No. 61/108,380, "STACKING METHOD FOR ENHANCED WATERMARK DETECTION," filed on Oct. 24, 2008, the disclosure of which is incorporated by reference in its entirety.

FIELD OF THE DISCLOSURE

The present disclosure pertains to monitoring media content and, more particularly, to methods and apparatus to extract data encoded in media content.

BACKGROUND

Identifying media information and, more specifically, audio streams (e.g., audio information) is useful for assessing audience exposure to television, radio, or any other media. For example, in television audience metering applications, a code may be inserted into the audio or video of media, wherein the code is later detected at monitoring sites when the media is presented (e.g., played at monitored households). The information payload of the code/watermark embedded into original signal can consist of unique source identification, time of broadcast information, transactional information or additional content metadata.

Monitoring sites typically include locations such as, for example, households where the media consumption of audience members or audience member exposure to the media is monitored. For example, at a monitoring site, codes from the audio and/or video are captured and may be associated with audio or video streams of media associated with a selected channel, radio station, media source, etc. The collected codes may then be sent to a central data collection facility for analysis. However, the collection of data pertinent to media exposure or consumption need not be limited to in-home exposure or consumption.

DETAILED DESCRIPTION

Figure 1:
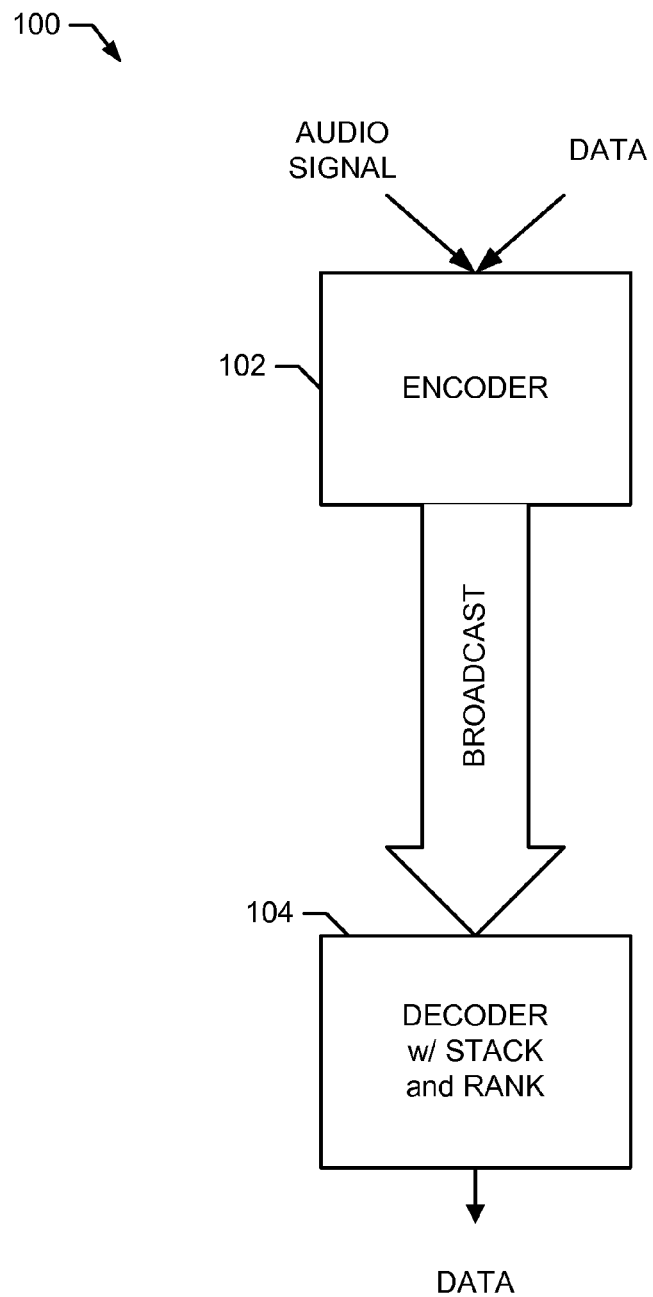
FIG. 1 is a block diagram of an example system for encoding data in a media content signal to transmit the data to a location where the media content signal is decoded to extract the data.

FIG. 1 is a block diagram of an example system 100 for encoding data in a media content signal to transmit the data to a location where the media content signal is decoded to extract the data. The example system 100 includes an encoder 102 and a decoder 104 with stack and rank functionality. According to the illustrated example, the encoder 102 encodes a received audio signal with a received data by amplifying or attenuating frequencies of interest as described in detail herein. The encoded audio signal is transported to another location where it is received by the decoder 104. The decoder 104 includes a stack functionality to stack consecutively received portions of the audio signal. In addition, the decoder 104 includes rank functionality to assign ranks to frequencies that may have been amplified or attenuated by the encoder 102. For example, where frequencies are grouped in neighborhoods of five frequencies, a rank of 0 to 4 may be assigned to each frequency. The decoder 104 then extracts the data from the stacked audio signal as described in detail herein. Stacking the encoded audio signal will, for example, improve the detection reliability of the decoder 104 when stacked portions include redundant or semi-redundant encoded data. While not shown in the illustrated example, the audio signal may also be output by the decoder 104 to be presented on a media presentation device (e.g., a radio, a television, etc.). Alternatively, the encoded audio signal may be transmitted to a media presentation device in parallel with the example decoder 104.

According to the example of FIG. 1, the encoder 102 receives as input an audio signal and data. The encoder 102 further divides the audio signal into frames, which are blocks of digital audio samples. As described in detail below, the encoder 102 encodes (embeds) the data into the framed audio signal and the encoded frame of audio is tested by the encoder 102 to determine if the modifications to the framed audio signal are significant enough to cause the encoding to be audibly perceptible by a human when the framed audio signal is presented to a viewer (e.g., using psychoacoustic masking). If the modifications to the framed audio signal are too significant and would result in an audible change in the audio, the framed audio is transmitted (e.g., broadcast, delivered to a broadcaster, etc.) without being encoded. Conversely, if the encoded audio frame has audio characteristics that are imperceptibly different from the un-encoded audio frame, the encoded audio frame is transmitted.

The encoder 102 inserts a unique or semi-unique 15-bit pseudorandom number (PN) synchronization sequence at the start of each message packet. To signal to the decoder 104 that a synchronization sequence is to be transmitted, the first code block of the synchronization sequence uses a triple tone. The triple tone is an amplification of three frequencies causing those frequencies to be maxima in their spectral neighborhoods. Thus, by looking for the triple tone, the decoder 104 can detect that a synchronization sequence is about to be sent without the need for decoding the entire synchronization sequence. An example implementation of a triple tone is described in U.S. Pat. No. 6,272,176 ('176 patent'), which is hereby incorporated by reference in its entirety. The example synchronization sequence is one approach for enabling the decoder 104 to detect the start of a new message packet. However, any other indication, signal, flag, or approach may be used.

The example encoder 102 transits as many as ten 15-bit PN sequences of message data following the synchronization. Thus, each message in the illustrated example comprises 11 groups: one 15-bit synchronization sequence followed by ten 15-bit message data sequences. However, any number of message data sequences may be transmitted between synchronization sequences. The example message data is transmitted in 15-bit PN sequences having ten error correction bits and five message data bits. In other words, message data is divided into groups of five bits each (e.g., ten 5-bit groups for a 50-bit message). Alternatively, any combination of message data bits and error correction bits may be included in a message data sequence. Each bit of the 15-bit PN sequence is encoded into a 512-sample block of audio. In the example system 100, one bit is transmitted at a time. Each 5 bits of payload data that is encoded as a 15-bit sequence uses 15 blocks of 512 samples (i.e., 7680 samples total). The example encoder 102 includes a $16^{th}$ block called the null block after the 15 blocks representing the 15-bit sequence. Thus, each message in the illustrated example uses 176 audio blocks: 16 blocks per sequence and 11 sequences per message. In the illustrated example, each message is followed by 11 unencoded blocks to adjust the total message duration to be approximately two seconds in the example encoding. While example encoding and block sizes are described, any desired encoding and block sizes may be used.

Figure 2:
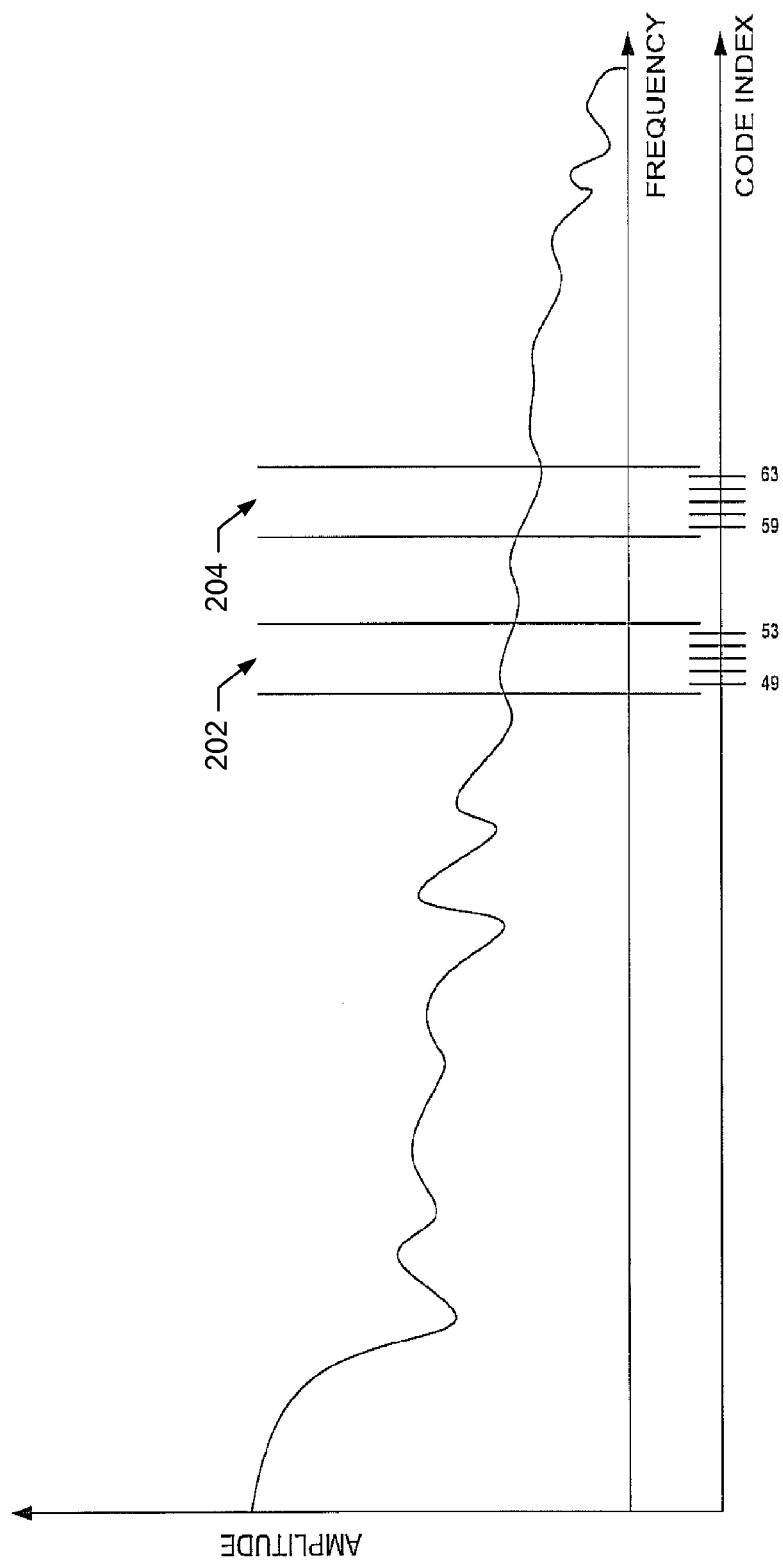
FIG. 2 is a graph of an example frequency spectrum and code indexing.

To insert a data bit (e.g., one bit of a 15-bit sequence) into an audio frame, the example encoder 102 makes a first selected frequency of the audio frame a local maximum and makes a second selected frequency of the audio frame a local minimum. For example, as shown in FIG. 2, the encoder 102 uses two audio frequency bands or neighborhoods 202 and 204, each including five frequencies or residents. One of the neighborhoods 202 and 204 is encoded to include a resident that is a local maximum and the other neighborhood 202 and 204 is encoded to include a resident that is a local minimum. The residents that are selected to be local maximum and local minimum are based on the coding block on which the example encoder 102 is operating and the value of the data bit to be transmitted. For example, to encode a logical "1" in the fifth encoding block, a resident having index number 50 in the neighborhood 202 is made a local maximum and a resident having index number 60 in the neighborhood 204 is made a local minimum. Conversely, to encode a logical "0" for the same encoding block, the resident having index number 50 in the neighborhood 202 would be made a local minimum and the resident having index number 60 in the neighborhood 204 would be made a local maximum. In other words, the frequencies that are selected do not represent the bit to be sent, the amplitudes at the selected frequencies represent the value of the bit because the same frequencies may be used whether the bit is a logical "1" or a logical "0". After encoding, the audio signal may be broadcast to a consumer location, may be transmitted to a broadcaster for broadcasting, may be stored to a storage media, etc.

The example system 100 may be configured to perform stacking and ranking in a system that is implemented with the Nielsen Audio Encoding System (NAES) described in the '176 patent. While this disclosure makes reference to encoding and decoding techniques of the NAES system described in the '176 patent by way of example, the methods and apparatus described herein are not limited to operation in conjunction with the techniques of the '176 patent. To the contrary, the example methods and apparatus may be implemented in conjunction with any type of encoding or decoding system. For example, the data rates, data grouping, message lengths, parameter lengths, parameter order in messages, number of parameters, etc. may vary based on the implemented encoding system.

Figure 3:
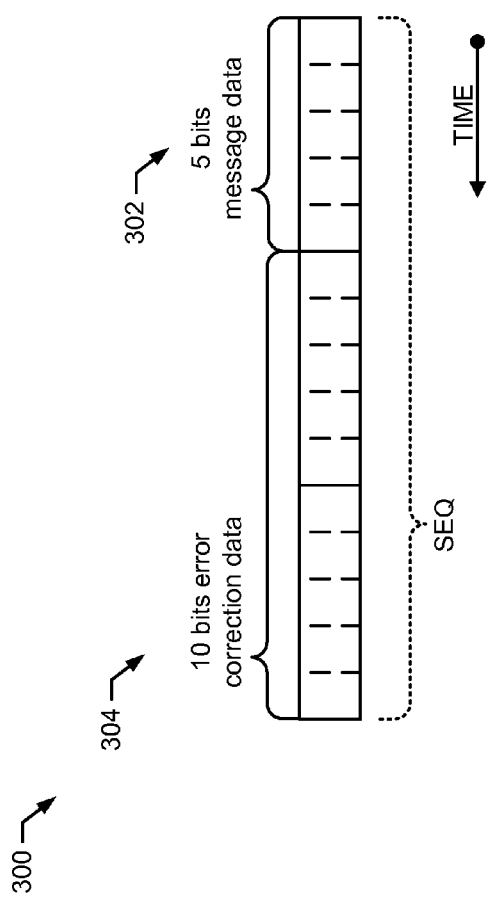
FIG. 3 illustrates an example sequence that may be encoded in an audio signal by the example encoder of FIG. 1.

FIG. 3 illustrates an example sequence 300 that may be encoded in an audio signal by the example encoder 102 of FIG. 1. The example sequence 300 includes 15 bits that are encoded in 15 blocks of audio data (e.g., 512 sample blocks). The message bits 302 convey five bits of message data. The message bits 302 are the payload data to be conveyed by the encoding. The error correction bits 304 convey ten bits of error correction data that may be used by the decoder 104 to verify and correct a received message. Each bit of the sequence 300 is encoded in a block of audio data. As described in conjunction with FIG. 1, for each block of audio data, a first selected frequency is made a local maximum and a second selected frequency is made a local minimum.

Figure 4:
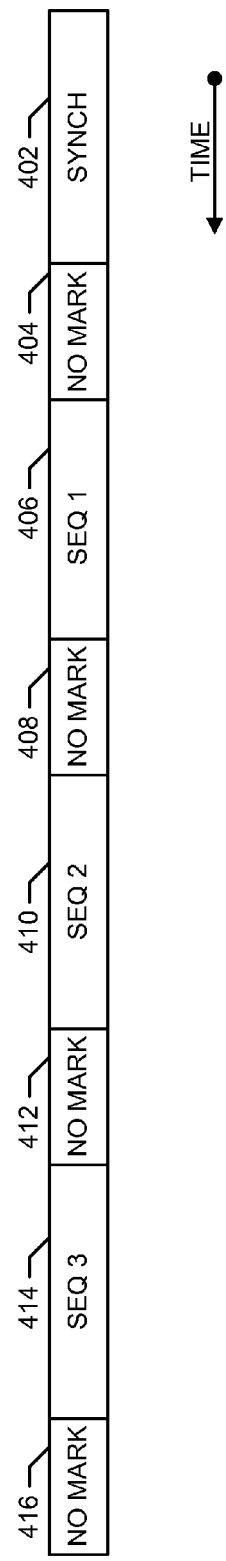
FIG. 4 illustrates an example message thread.

FIG. 4 illustrates an example message thread 400. The message thread 400 of the illustrated example includes a synch sequence 402, a first sequence 406, a second sequence 410, a third sequence 414, and no mark blocks 404, 408, and 412. The example synch sequence 402 is a 15 bit sequence that indicates the start of a new message thread. The first sequence 406, the second sequence 410, and the third sequence 414 of the illustrated example are 15 bit sequences that each convey five message payload bits and ten error correction bits as described in conjunction with FIG. 3. The no mark blocks 404, 408, and 412 are single blocks that include no encoding (e.g., 512 samples of audio data in which no frequencies are amplified or attenuated by the encoder 102). While the example message thread 400 is formatted as described, any other formatting may be used. For example, more or fewer sequences may be included in a message thread 400, sequences 406, 410, and 414 may contain more or fewer data bits and/or error correction bits, the no mark blocks 404, 408, and 412 may include multiple blocks, more or fewer no mark blocks 404, 408, and 412 may be included, etc.

Figure 5:
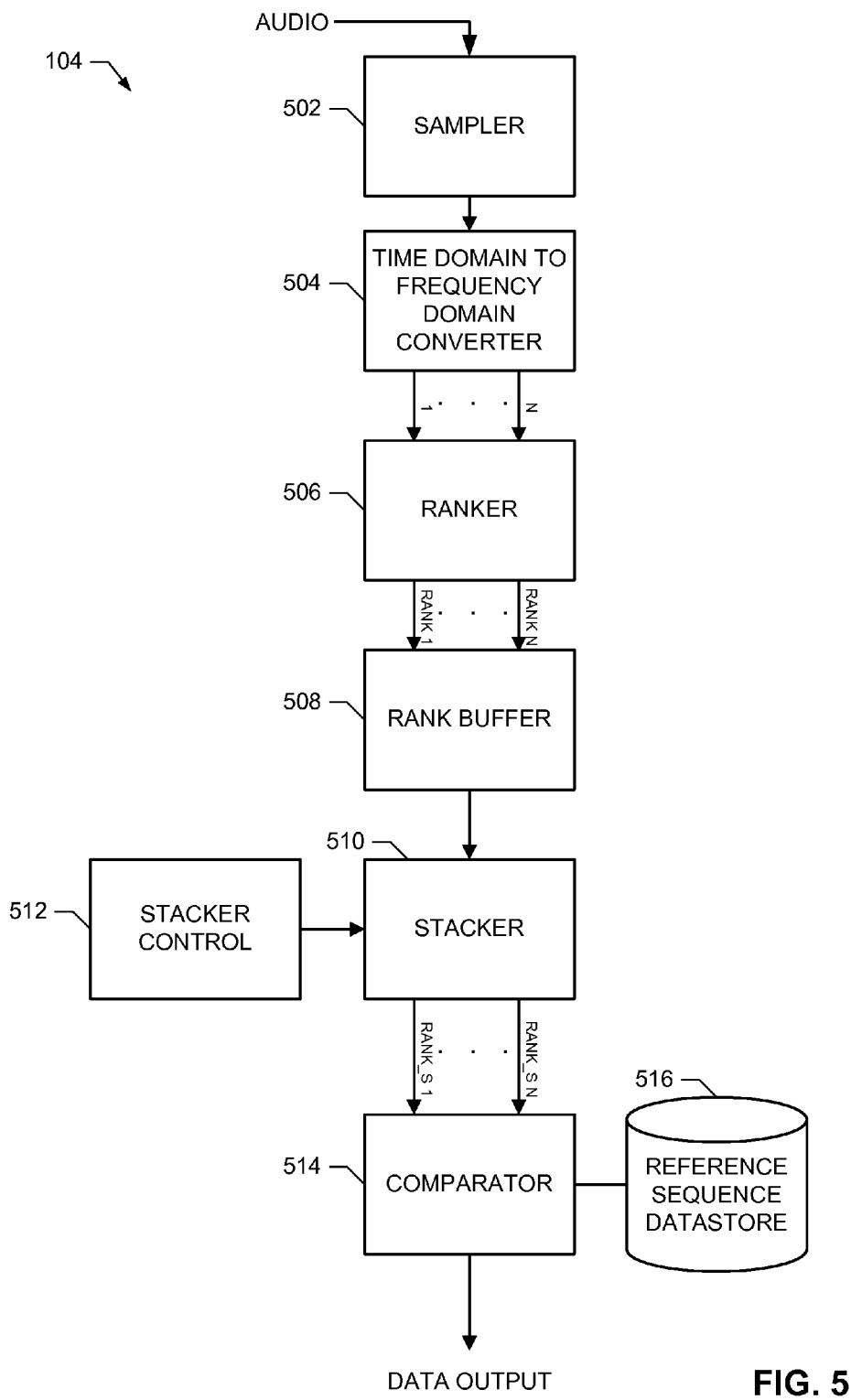
FIG. 5 is a block diagram of an example apparatus to implement the decoder of FIG. 1 that includes stack and rank functionality.

FIG. 5 is a block diagram of an example apparatus to implement the decoder 104 of FIG. 1 that includes stack and rank functionality. The example decoder 104 includes a sampler 502, a time domain to frequency converter 504, a ranker 506, a rank buffer 508, a stacker 510, a stacker control 512, a comparator 514, and a reference sequence datastore 516. The example decoder 104 receives an input audio (e.g., an audio portion of a television program) and processes the audio to extract and output data encoded in the audio.

The sampler 502 of the illustrated examples samples the incoming audio. The sampler 502 may be implemented using an analog to digital converter (A/D) or any other suitable technology, to which encoded audio is provided in analog format. The sampler 502 samples the encoded audio at, for example, a sampling frequency of 48 KHz. Of course, other sampling frequencies may be selected in order to increase resolution or reduce the computational load at the time of decoding. Alternatively, the sampler 502 may be eliminated if audio is provided in digitized format.

The time domain to frequency domain converter 504 of the illustrated example may be implemented using a discrete Fourier transformation (DFT), or any other suitable technique to convert time-based information into frequency-based information. In one example, the time domain to frequency domain converter 504 may be implemented using a sliding DFT in which a spectrum of the code frequencies of interest (e.g., frequencies indexed 1 to N in FIG. 5) is calculated each time four new samples are provided to the example time domain to frequency domain converter 504. In other words, four new samples are shifted into the analysis windows, four old samples are shifted out of the analysis window, and the DFT of the analysis window is computed. Because the boundaries of blocks are not known when decoding, a sliding DFT may operate by sliding 4 samples at a time to give 128 distinct message threads to analyze per 512 samples of audio that are received. Thus, at the end of 128 slides (of four samples each), all 512 samples (i.e., one block worth of samples) will have been processed and analyzed. The resolution of the spectrum produced by the time domain to frequency domain converter 504 increases as the number of samples (e.g., 512 or more) used to generate the spectrum increases. Thus, the number of samples processed by the time domain to frequency domain converter 504 should match the resolution used to select the residents shown in FIG. 2. The finer the frequency spacing between the residents, the more samples that will be used to generate the spectrum for detection of the residents.

The spectrum produced by the time domain to frequency domain converter 504 passes to the ranker 506. The ranker 506 of the illustrated example ranks the amplitude of each frequency of interest (e.g., RANK 1 to RANK N for the 1 to N frequency indices of interest in FIG. 5) in neighborhoods in the received spectrum relative to the amplitude of the other frequencies in the neighborhood. For example, when there are five frequencies in each neighborhood, the amplitude of each frequency may be ranked on a scale of 0 to 4, where 0 is the lowest amplitude and 4 is the greatest amplitude. While the forgoing example describes ranking each spectrum frequency, any subset of frequencies may alternatively be ranked such as, for example, only frequencies of interest that may have been amplified or attenuated to embed information in the audio data. The ranker 506 outputs a set of rank values to the rank buffer 508.

The rank buffer 508 stores the set of rank values in a circular buffer such that once the buffer has been filled, each new set of ranks will replace the oldest set of ranks in the buffer. The rank buffer 508 of the illustrated example stores the 128 sets of ranks (e.g., 128 sets of ranks 1 to N) corresponding to each slide of the time domain to frequency domain converter 504. In addition, the rank buffer 508 may store multiple messages worth of ranks. For example, as described in detail below, the rank buffer 508 may store five messages worth of ranks so that the blocks of messages may be averaged. While the rank buffer 508 is described as a circular buffer and type of data structure and storage may be used. For example, the rank buffer 508 may comprise one or more registers, one or more files, one or more databases, one or more buffers of any type, etc.

An example set of ranks may be:

message may be 50 bits including a broadcaster identifier (e.g., a 16-bit station identifier) followed by a timestamp (e.g., a 32-bit timestamp that denotes time elapsed in seconds since, for example, Jan. 1, 1995), followed by a level specification that allows multiple levels of messages to be included (e.g., a 2-bit level specification). In the example 50 bit message, all but the least significant bits of the message will be repeated for several messages in a row. In the example encoding where messages are divided into ten groups and include one synch group (e.g., 11 total groups), it is expected that the first ten groups will repeat from message to message and the last group (e.g., that contains the three least significant bits of the timestamp and two level specification bits) will change from message to message. Because the three least significant bits can represent eight seconds and messages in the example encoding are encoded into approximately two seconds of audio each, the fourth least significant bit of the message will change after four messages. Accordingly, the synchronization group and the first nine data groups are expected to repeat for four messages (approximately eight seconds).

The stacking process may be performed according to the following formulas:

$$r_{1km_n} = \frac{\sum_{p=n}^{p=n-S} r_{1km_p}}{S} \text{ and } r_{2km_n} = \frac{\sum_{p=n}^{p=n-S} r_{2km_p}}{S}$$

where p is a message index (e.g., $0 \leq p \leq 5$) when five consecutive messages are to be averaged), k is a block index (e.g., $0 \leq k \leq 16$ when there are 16 blocks per sequence), S is the number of consecutive messages to be averaged (e.g., 5 when five consecutive messages are to be averaged), $r_{1km_n}$ is the average rank of the first frequency of interest in the $k^{th}$ block of a message $m_n$, and $r_{2km_n}$ is the average rank of the second frequency of interest in the $k^{th}$ block of message $m_n$. For example, a message may be a station identifier and a timestamp that are encoded every 2 seconds. While the least significant bits of the time stamp (e.g., seconds) may change from message to message, the other bits (e.g., more significant bits of a timestamp) will not change between every message. Accordingly, when the ranks of the current message are added to the ranks of the previous four messages, the average ranking can improve detection by reducing the effect of any noise that may have been present for less than all of the

| | DATA BITS | | | | | ERROR CORRECTION BITS | | | | | | | | | | |
|---|---|---|---|---|---|---|---|---|---|---|---|---|---|---|---|---|
| BLOCK | 0 | 1 | 2 | 3 | 4 | 5 | 6 | 7 | 8 | 9 | 10 | 11 | 12 | 13 | 14 | 15 |
| RANKS | 2, 4 | 1, 4 | 4, 1 | 4, 0 | 0, 4 | 3, 1 | 3, 0 | 4, 1 | 4, 1 | 4, 2 | 2, 3 | 4, 3 | 4, 1 | 0, 4 | 4, 0 | 0, 0 |

The stacker 510 takes advantage of message-to-message redundancy to improve the detection of data encoded in audio signals. In particular, when enabled by the stacker control 512, the stacker 510 retrieves the ranks of consecutive messages from the rank buffer 508 and adds the ranks of corresponding blocks of the consecutive messages. The stacker 510 then divides the sums by the number of messages added together. Accordingly, the stacker 510 determines an average of the ranks for consecutive blocks. When messages include redundancy, the ranks will average in order to eliminate errors introduced by noise or host audio. For example, an encoded messages. When the stacker 510 is enabled, the stacker 510 outputs the stacked set of ranks (e.g., RANK_S 1 to stacked RANK_S in FIG. 5) to the comparator 514. When the stacker 512 is not enabled, the stacker 510 outputs the set of ranks (e.g., RANK_S 1 to RANK_S N) retrieved from the rank buffer 508 to the comparator 514.

In an example, the following ranks may be determined for corresponding packets that are repetitions of the same message:

| | DATA BITS | | | | | ERROR CORRECTION BITS | | | | | | | | | | |
|---|---|---|---|---|---|---|---|---|---|---|---|---|---|---|---|---|
| BLOCK | 0 | 1 | 2 | 3 | 4 | 5 | 6 | 7 | 8 | 9 | 10 | 11 | 12 | 13 | 14 | 15 |
| RANK MSG0 | 2, 4 | 1, 4 | 4, 1 | 4, 0 | 1, 4 | 3, 1 | 3, 0 | 4, 1 | 4, 1 | 4, 2 | 2, 3 | 4, 3 | 4, 1 | 0, 3 | 4, 0 | 0, 0 |
| RANK MSG1 | 0, 4 | 1, 4 | 4, 1 | 4, 1 | 0, 2 | 4, 1 | 3, 0 | 3, 1 | 4, 1 | 4, 2 | 2, 3 | 4, 3 | 4, 2 | 0, 4 | 4, 1 | 0, 0 |
| RANK MSG2 | 0, 4 | 1, 4 | 3, 1 | 4, 2 | 0, 4 | 3, 1 | 3, 0 | 4, 1 | 4, 2 | 4, 2 | 2, 3 | 4, 2 | 4, 1 | 0, 4 | 4, 2 | 0, 0 |
| RANK MSG3 | 1, 4 | 1, 4 | 4, 2 | 4, 0 | 2, 4 | 3, 2 | 3, 0 | 4, 1 | 4, 1 | 4, 1 | 2, 4 | 4, 3 | 4, 1 | 0, 4 | 4, 0 | 0, 0 |
| RANK MSG4 | 4, 2 | 1, 4 | 4, 1 | 4, 2 | 0, 3 | 3, 1 | 3, 0 | 4, 1 | 4, 1 | 4, 2 | 2, 3 | 4, 3 | 4, 1 | 0, 4 | 4, 0 | 0, 0 |

The sum of the ranks is:

| | DATA BITS | | | | | ERROR CORRECTION BITS | | | | | | | | | | |
|---|---|---|---|---|---|---|---|---|---|---|---|---|---|---|---|---|
| BLOCK | 0 | 1 | 2 | 3 | 4 | 5 | 6 | 7 | 8 | 9 | 10 | 11 | 12 | 13 | 14 | 15 |
| RANK SUM | 7, 18 | 5, 20 | 19, 6 | 20, 5 | 3, 17 | 16, 6 | 15, 0 | 19, 5 | 20, 6 | 20, 9 | 10, 16 | 20, 14 | 20, 6 | 0, 19 | 20, 3 | 0, 0 |

The average of the ranks is:

| | DATA BITS | | | | | ERROR CORRECTION BITS | | | | | | | | | | |
|---|---|---|---|---|---|---|---|---|---|---|---|---|---|---|---|---|
| BLOCK | 0 | 1 | 2 | 3 | 4 | 5 | 6 | 7 | 8 | 9 | 10 | 11 | 12 | 13 | 14 | 15 |
| RANK AVG | 1.4, 3.6 | 1,4 | 3.8, 1.2 | 4,1 | 0.6, 3.4 | 3.2, 1.2 | 3, 0 | 3.8,1 | 4, 1.2 | 4, 1.8 | 2, 3.2 | 4, 2.8 | 4, 1.2 | 0, 3.8 | 4, 0.6 | 0, 0 |

As shown in the example, even when Block 0 of Message 4 has been ranked in a manner that suggests the opposite data bit as the previous four messages (i.e., 4,2 would suggest a bit value of 1, while the other values suggest a bit value of 0), averaging of the ranking results in an average that suggests a bit value of 0. Accordingly, even when error due to noise is introduced, averaging of the ranks can result in ranking that more closely matches the encoded data.

The stacker control 512 controls when the stacker 510 is enabled or disabled. For example, when the stacker 510 is disabled, messages may be processed one at time without any averaging of the ranks. When the stacker 510 is enabled by the stacker control 512, stacking of messages is performed as described herein or using any other process. The stacker control 512 may enable stacking based on any criteria. For example, the stacker control 512 may enable provide selective stacking by automatically enabling stacking when noise is detected, when a poor quality audio connection is present (e.g., when a microphone is used rather than a physical connection), when the decoder 104 is at a distance from an audio source (e.g., a mobile device across the room from an audio source), etc. Additionally or alternatively, the stacker control 512 may be manually controlled to enable stacking when requested by a user and/or may be remotely controlled by a message from a central location, the encoder 102, etc.

The comparator 514 of the illustrated example receives the set of ranks or stacked ranks ("set of ranks") for a sequence from the stacker 510 and determines if a synch sequence has been recognized. If a synch sequence has not been detected, the comparator 514 compares the received set of ranks to a reference synch sequence and sets a synch detected flag if the set of ranks is determined to correspond to a synch sequence. If a synch sequence has previously been detected, the comparator 514 compares the set of ranks to a reference set of sequences stored in the reference sequence data store 516. The reference set of sequence comprise a listing of possible ranks and associated high or low indications for the frequencies of interest for each block. For example, when each sequence includes 5 data bits, 10 error correction bits, and one blank block, there would be $2^5$ possible Bose and Ray-Chaudhuri (BCH) codewords of 15 bits, each bit having an indication of whether each of two frequencies of interest were attenuated or amplified (i.e., 30 indications). To determine the sequence corresponding to the set of ranks, the set of ranks is compared to each of the reference sequences. The reference sequence with the smallest different from the set of ranks is identified as the received sequence.

For example, when the received set of ranks provided by the stacker 510 is:

|  | DATA BITS | | | | | ERROR CORRECTION BITS | | | | | | | | | | |
|---|---|---|---|---|---|---|---|---|---|---|---|---|---|---|---|---|
| BLOCK | 0 | 1 | 2 | 3 | 4 | 5 | 6 | 7 | 8 | 9 | 10 | 11 | 12 | 13 | 14 | 15 |
| RANKS | 2, 4 | 1, 4 | 4, 1 | 4, 0 | 0, 4 | 3, 1 | 3, 0 | 4, 1 | 4, 1 | 4, 2 | 2, 3 | 4, 3 | 4, 1 | 0, 4 | 4, 0 | 0, 0 |

The closest reference sequence may be the following set for data bits 0,0,1,1,0:

|  | DATA BITS | | | | | ERROR CORRECTION BITS | | | | | | | | | | |
|---|---|---|---|---|---|---|---|---|---|---|---|---|---|---|---|---|
| BLOCK | 0 | 1 | 2 | 3 | 4 | 5 | 6 | 7 | 8 | 9 | 10 | 11 | 12 | 13 | 14 | 15 |
| RANKS | 0, 4 | 0, 4 | 4, 0 | 4, 0 | 0, 4 | 4, 0 | 4, 0 | 4, 0 | 4, 0 | 4, 0 | 4, 0 | 4, 0 | 4, 0 | 0, 4 | 4, 0 | 0, 0 |
| Bit Val. | 0 | 0 | 1 | 1 | 0 | 1 | 1 | 1 | 1 | 1 | 1 | 1 | 1 | 0 | 1 | — |

When compared by determining the distance or absolute value of the difference of the reference ranks and the received set of ranks, the difference is:

|  | DATA BITS | | | | | ERROR CORRECTION BITS | | | | | | | | | | |
|---|---|---|---|---|---|---|---|---|---|---|---|---|---|---|---|---|
| BLOCK | 0 | 1 | 2 | 3 | 4 | 5 | 6 | 7 | 8 | 9 | 10 | 11 | 12 | 13 | 14 | 15 |
| DIFF. | 2, 0 | 1, 0 | 0, 1 | 0, 0 | 0, 0 | 1, 1 | 1, 0 | 0, 1 | 0, 1 | 0, 2 | 2, 3 | 0, 3 | 0, 1 | 0, 0 | 0, 0 | 0, 0 |

The numerical difference (e.g., hamming distance) is the sum of the difference row, which equals 20. This difference would be compared to the difference for all other possible sequences. If this difference was less than all other distances, then the reference sequence is determined to be the closest match.

In addition to determining the closest sequence from the reference set of sequences, the comparator 514 may also determine if the difference for the closest sequence exceeds a threshold. For example, the comparator 514 may discard the result if the difference is greater than a threshold, meaning that the closest reference sequence was significantly different than the received set of ranks. In other words, the comparator 514 may ensure that the received set of ranks are close enough to the determined reference sequence before outputting the sequence.

The example comparator 514 is further configured to reconstruct the least significant bits (LSB) of a detected sequence. The LSB may need to be reconstructed when the stacker is enabled and several messages are averaged. Such averaging will cause the LSB (or other rapidly changing data) that varies among the averaged messages to be recreated. Any method for reconstructed the data may be used. For example, if the data to be reconstructed is the LSB of a timestamp, one message may be detected without the use of stacking and a timer may be used to determine the difference in time between the known LSB and the current message so that the LSB of the timestamp can be recreated and the determined message modified to include the correct LSB.

The reference sequence 516 of the illustrated example may be implemented by any type of data storage. For example, the reference sequence datastore 516 may be a file, a database, a table, a list, an array, or any other type of datastore. While the example reference sequence 516 stores the 32 possible BCH sequences, any number of sequences may be stored. For example, a partial set of sequences may be stored.

Figure 6:
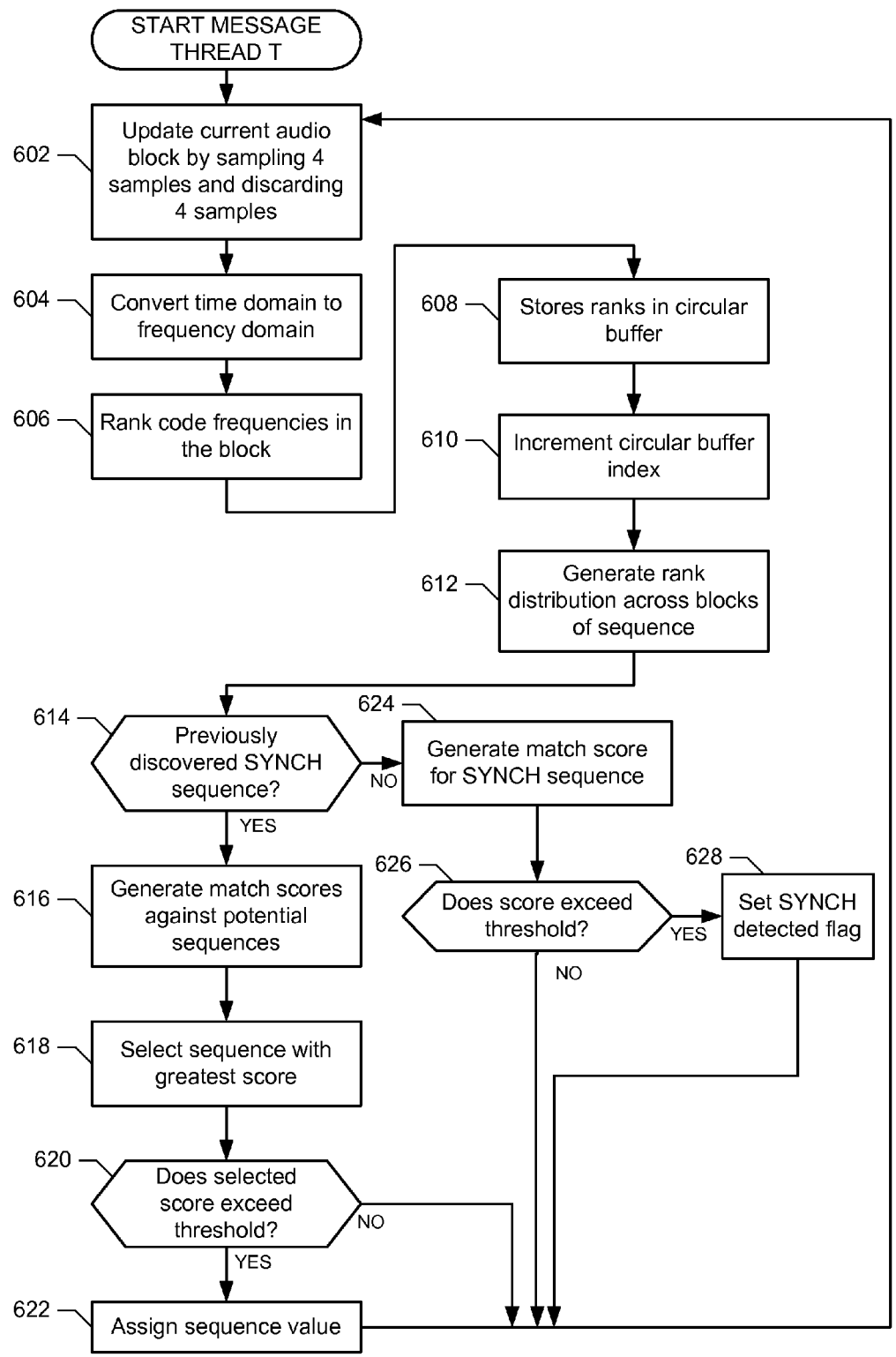
FIG. 6 is a flowchart of an example process to decode a message in audio.
Figure 7:
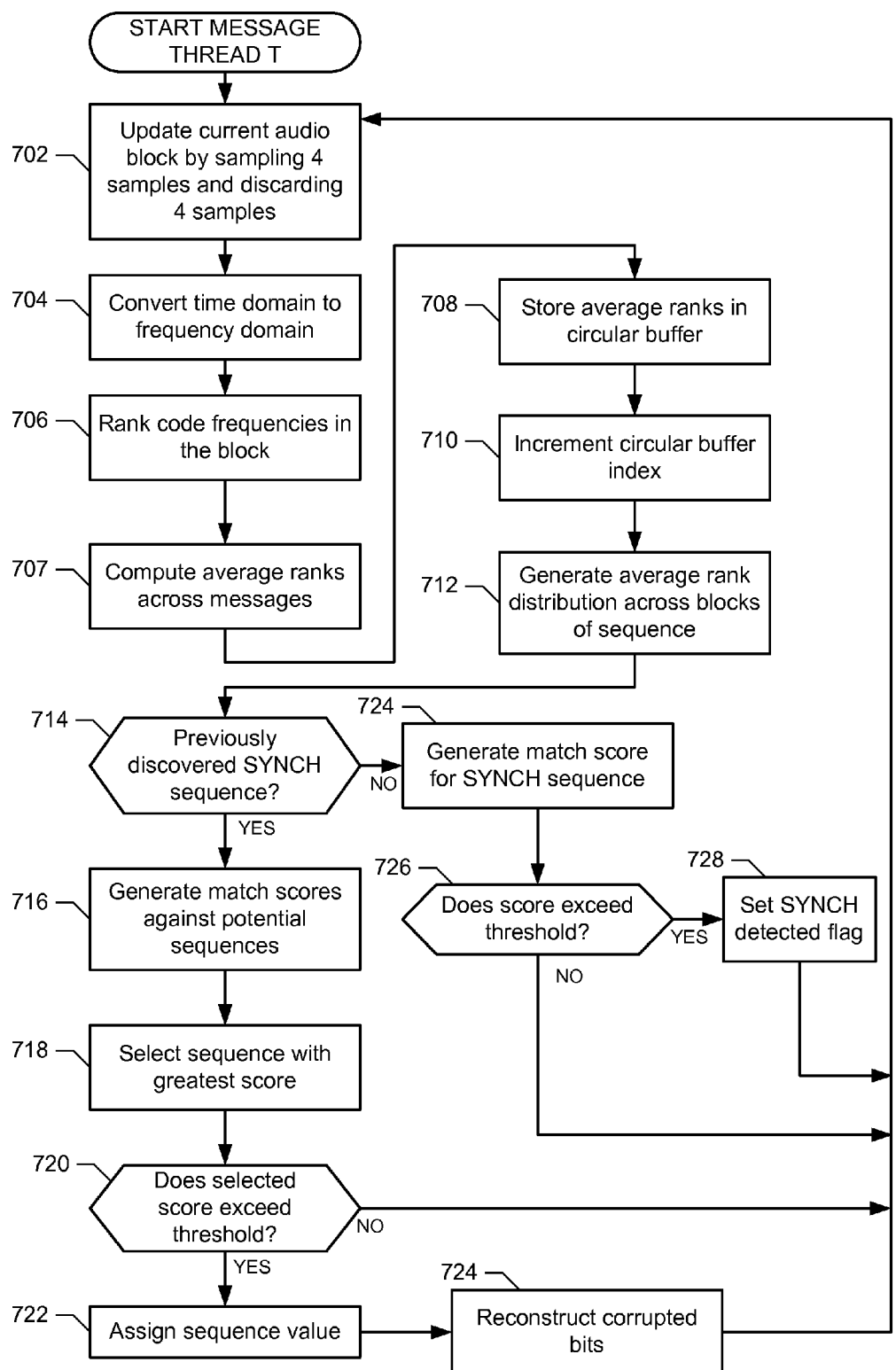
FIG. 7 is a flowchart of an example process to decode a message in audio using stacking.

Flowcharts representative of example processes that may be executed to implement some or all of the elements of the system 100 and the decoder 104 are shown in FIGS. 6-7.

In these examples, the process represented by each flowchart may be implemented by one or more programs comprising machine readable instructions for execution by: (a) a processor, such as the microprocessor 812 shown in the example computer 800 discussed below in connection with FIG. 8, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 812, but the entire program or programs and/or portions thereof could alternatively be executed by a device other than the microprocessor 812 and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example mobile communications system components could be implemented by any combination of software, hardware, and/or firmware. Also, some or all of the processes represented by the flowcharts of FIGS. 6-7 may be implemented manually.

Further, although the example processes are described with reference to the flowcharts illustrated in FIGS. 6-7, many other techniques for implementing the example methods and apparatus described herein may alternatively be used. For example, with reference to the flowcharts illustrated in FIGS. 6-7, the order of execution of the blocks may be changed, and/or some of the blocks described may be changed, eliminated, combined, and/or subdivided into multiple blocks. While the processes of FIGS. 6-7 are described in conjunction with the decoder 104, any apparatus or system may implement the processes of FIGS. 6-7.

FIG. 6 is a flowchart of an example process to decode a message in audio. The process of FIG. 6 begins when the sampler 502 updates a current audio block by sampling 4 samples and discarding 4 samples from an analysis window (block 602). The example time domain to frequency converter 504 performs a sliding FFT to convert the sampled audio from the time domain to the frequency domain (block 604). The ranker 506 ranks the code frequencies in the converted audio (block 606). For example, as described above, frequencies of interest may be ranked on a scale of 0 to 4 when there are five frequencies in each neighborhood. The determined ranks are stored in the rank buffer 508 (block 608). When the rank buffer 508 is a circular buffer, the addition of the determined ranks will eliminate a previously stored rank. In addition, when the rank buffer 508 is a circular buffer, an index indicating the point at which the next set of ranks should be inserted to the rank buffer 508 is incremented (block 610).

The comparator 512 then generates a rank distribution array across the number of blocks in a sequence (e.g., 15 blocks) (block 612). Next, the comparator 514 determines if a synch sequence has previously been detected (block 614). The synch sequence indicates the start of a message. Therefore, when the synch has previously been detected, a message thread has started. When a synch sequence has not previously been detected, control proceeds to block 624, which is described below.

When a synch sequence has previously been detected (block 614), the comparator 514 generates match scores against all potential sequences (e.g., 32 possible BCH sequences) (block 616). For example, the comparator 514 may determine a distance between the rank distribution and each of the potential sequences. The comparator 514 then selects the potential sequence with the greatest score (e.g., smallest distance) (block 618). The comparator 514 determines if the selected score exceeds a threshold (block 620). For example, if the score is a distance, the comparator 514 determines if the distance is less than a threshold distance. When the score does not exceed the threshold, control proceeds to block 602 to continue processing.

When the score exceeds the threshold (block 620), the comparator 514 assigns the value to the sequence (block 622). Control then proceeds to block 602 to continue processing.

Returning to block 624, when a match has not been previously detected (block 614), the comparator 514 generates a match score for the synch sequence (block 624). For example, as described above the comparator 514 may determine a distance between the rank distribution and the reference synch sequence. The comparator 514 determines if the score exceeds a threshold (block 626). When the score does not exceed the threshold, control proceeds to block 602 to continue processing. When the score exceeds the threshold, a flag is set indicating that a synch has been detected (block 628). Control then proceeds to block 602 to continue processing. While a flag is described above, any indication that a synch has been detected may be used. For example, a variable may be stored, the synch sequence may be stored in a table, etc. In addition, while the example process includes a separate branch for detecting a synch sequence, synch sequences may be detected in the same branch as other FIG. 7 is a flowchart of an example process to decode a message in audio. The process of FIG. 7 utilizes stacking to improve decoding accuracy. The process of FIG. 7 begins when the sampler 502 updates a current audio block by sampling 4 samples and discarding 4 samples from an analysis window (block 702). The example time domain to frequency converter 504 performs a sliding FFT to convert the sampled audio from the time domain to the frequency domain (block 704). The ranker 506 ranks the code frequencies in the converted audio (block 706). For example, as described above, frequencies of interest may be ranked on a scale of 0 to 4 when there are five frequencies in each neighborhood. The stacker 510 then adds the determined ranks to the ranks of corresponding blocks of previous messages and divided by the number of messages to determine an average rank (block 707). For example, the determined ranks may be added to the corresponding ranks of the previous 4 messages.

The average ranks are stored in the rank buffer 508 (block 708). When the rank buffer 508 is a circular buffer, the addition of the average ranks will eliminate a previously stored rank. In addition, when the rank buffer 508 is a circular buffer, an index indicating the point at which the next set of ranks should be inserted to the rank buffer 508 is incremented (block 710). Alternatively, the ranks may be stored in the rank buffer 508 after block 706 and may retrieved from the rank buffer 508 as part of block 707.

The comparator 514 then generates a rank distribution array across the number of blocks in a sequence (e.g., 15 blocks) (block 712). Next, the comparator 514 determines if a synch sequence has previously been detected (block 714). The synch sequence indicates the start of a message. Therefore, when the synch has previously been detected, a message thread has started. When a synch sequence has not previously been detected, control proceeds to block 724, which is described below.

When a synch sequence has previously been detected (block 714), the comparator 514 generates match scores against all potential sequences (e.g., 32 possible BCH sequences) (block 716). For example, the comparator 514 may determine a distance between the rank distribution and each of the potential sequences. The comparator 514 then selects the potential sequence with the greatest score (e.g., smallest distance) (block 718). The comparator 514 determines if the selected score exceeds a threshold (block 720). For example, if the score is a distance, the comparator 514 determines if the distance is less than a threshold distance. When the score does not exceed the threshold, control proceeds to block 702 to continue processing.

When the score exceeds the threshold (block 720), the comparator 514 assigns the value to the sequence (block 722). The comparator 512 then reconstructs any data that may have been corrupted by the stacking process. For example, that comparator 512 may determine a corrupted portion of a timestamp (e.g., a second indication) by decoding one message and tracking the amount of time that passes between the decoded message and a currently detected message. Control then proceeds to block 702 to continue processing.

Returning to block 724, when a match has not been previously detected (block 714), the comparator 514 generates a match score for the synch sequence (block 724). For example, as described above the comparator 514 may determine a distance between the rank distribution and the reference synch sequence. The comparator 514 determines if the score exceeds a threshold (block 726). When the score does not exceed the threshold, control proceeds to block 702 to continue processing. When the score exceeds the threshold, a flag is set indicating that a synch has been detected (block 728). Control then proceeds to block 702 to continue processing. While a flag is described above, any indication that a synch has been detected may be used. For example, a variable may be stored, the synch sequence may be stored in a table, etc. In addition, while the example process includes a separate branch for detecting a synch sequence, synch sequences may be detected in the same branch as other sequences and processing may later be performed to identify a synch sequence that indicates that start of a message thread. Further, while the process of FIG. 7 is illustrated as a continuous loop, any flow may be utilized.

Figure 8:
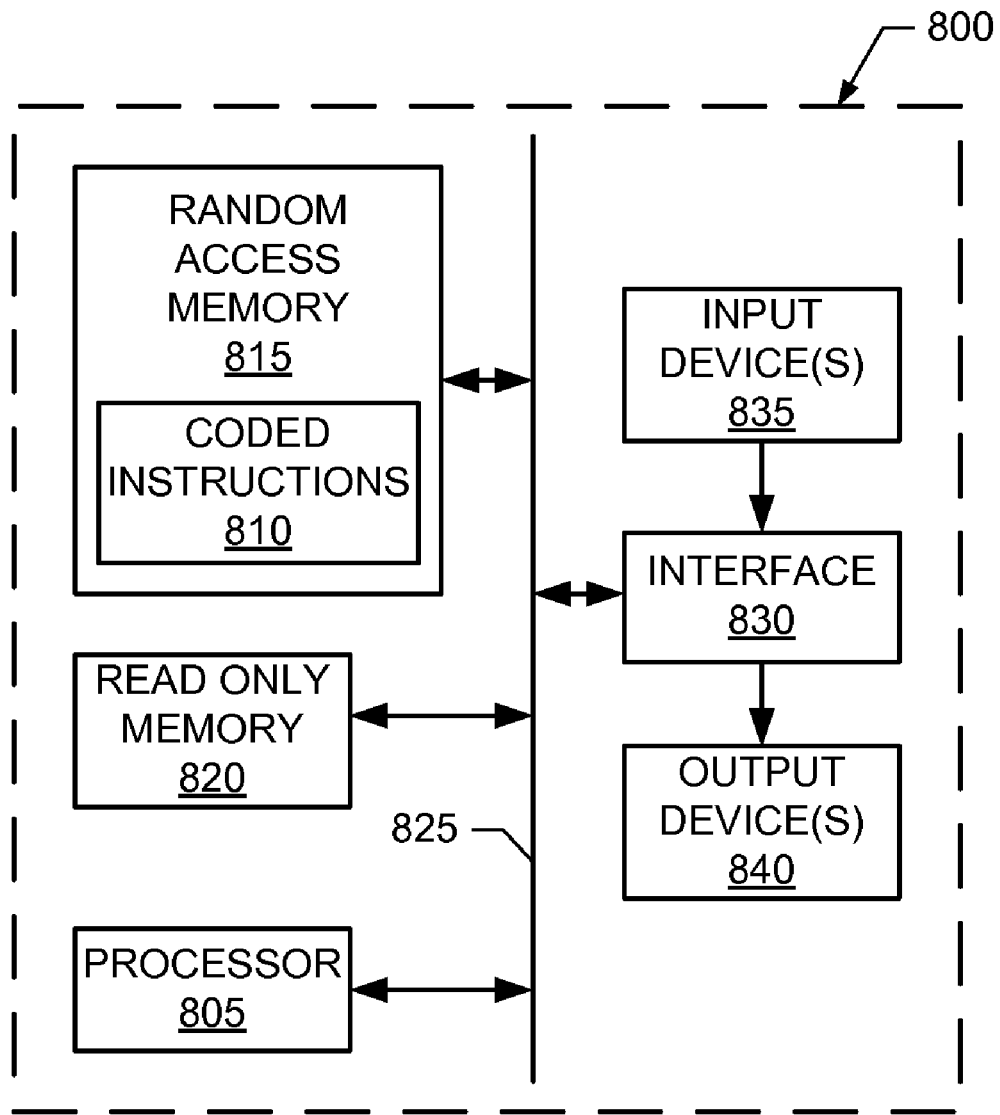
FIG. 8 is a schematic illustration of an example processor platform that may be used and/or programmed to perform any or all of the example machine accessible instructions of FIGS. 6-7 to implement any or all of the example systems, example apparatus and/or example methods described herein.

FIG. 8 is a schematic diagram of an example processor platform 800 that may be used and/or programmed to implement any or all of the example system 100 and the decoder 104, and/or any other component described herein. For example, the processor platform 800 can be implemented by one or more general purpose processors, processor cores, microcontrollers, etc. Additionally, the processor platform 800 may be implemented as a part of a device having other functionality. For example, the processor platform 800 may be implemented using processing power provided in a mobile telephone, or any other handheld device.

The processor platform 800 of the example of FIG. 8 includes at least one general purpose programmable processor 805. The processor 805 executes coded instructions 810 and/or 812 present in main memory of the processor 805 (e.g., within a RAM 815 and/or a ROM 820). The processor 805 may be any type of processing unit, such as a processor core, a processor and/or a microcontroller. The processor 805 may execute, among other things, example machine accessible instructions implementing the processes described herein. The processor 805 is in communication with the main memory (including a ROM 820 and/or the RAM 815) via a bus 825. The RAM 815 may be implemented by DRAM, SDRAM, and/or any other type of RAM device, and ROM may be implemented by flash memory and/or any other desired type of memory device. Access to the memory 815 and 820 may be controlled by a memory controller (not shown).

The processor platform 800 also includes an interface circuit 830. The interface circuit 830 may be implemented by any type of interface standard, such as a USB interface, a Bluetooth interface, an external memory interface, serial port, general purpose input/output, etc. One or more input devices 835 and one or more output devices 840 are connected to the interface circuit 830.

Although certain example apparatus, methods, and articles of manufacture are described herein, other implementations are possible. The scope of coverage of this patent is not limited to the specific examples described herein. On the contrary, this patent covers all apparatus, methods, and articles of manufacture falling within the scope of the invention.

What is claimed is:

1. A method to extract information from media content, the method comprising:
    receiving a media content signal;
    sampling the media content signal to generate digital samples;
    determining a frequency domain representation of the digital samples;
    determining a first rank of a first frequency in the frequency domain representation;
    determining a second rank of a second frequency in the frequency domain representation;
    combining the first rank and the second rank with a set of ranks to create a combined set of ranks;
    comparing the combined set of ranks to a set of reference sequences;
    determining information represented by the combined set of ranks based on the comparison; and
    storing the data in a tangible memory;
    wherein the first rank and the second rank are associated with a first message at a first time; and
    wherein combining the first rank and the second rank with the set of ranks to create the combined set of ranks includes determining an average of the first rank and at least another rank for the first frequency of interest of at least another message at a time earlier than the first time to determine a first average rank, determining an average of the second rank and at least another rank for the second frequency of interest of at least another message at a time earlier than the first time to determine a second average rank, combining the first average rank and the second average rank with the set of ranks to create the combined set of ranks.

2. A method as defined in claim 1, wherein comparing the combined set of ranks to the reference set of ranks includes determining a set of distances between the combined set of ranks and one or more of the sequences in the reference set of sequences.

3. A method as defined in claim 2, wherein determining the data represented by the combined set of ranks includes selecting a sequence in the reference set of sequences that has the smallest distance.

4. A method as defined in claim 1, wherein the first rank indicates an amplitude of the first frequency of interest relative to other frequencies in a neighborhood.

5. A method as defined in claim 4, wherein a number of frequencies in the neighborhood is equal to a number of possible rank values.

6. A method as defined in claim 1, further comprising determining a first average rank for a first frequency in the frequency domain representation and determining a second average rank for a second frequency in the frequency domain representation.

7. A method as defined in claim 6, wherein the information is encoded in the media content signal after T seconds and wherein determining a first average rank for the first frequency comprises determining a third rank for a first frequency approximately T seconds before determining the first rank and adding the first rank and the third rank.

8. An apparatus to extract information from media content, the apparatus comprising:
    a sampler to receive a media content signal and to sample the media content signal to generate digital samples;
    a time domain to frequency domain converter to determine a frequency domain representation of the digital samples;
    a ranker to determine a first rank of a first frequency in the frequency domain representation and to determine a second rank of a second frequency in the frequency domain representation; and
    a comparator to combine the first rank and the second rank with a set of ranks to create a combined set of ranks, to compare the combined set of ranks to a set of reference sequences, to determine information represented by the combined set of ranks based on the comparison, and to store the data in a tangible memory;
    wherein at least one of the sampler, the time domain to frequency domain converter, the ranker, and the comparator is implemented by hardware;
    wherein the first rank and the second rank are associated with a first message at a first time; and
    wherein the comparator is to combine the first rank and the second rank with the set of ranks to create the combined set of ranks by determining an average of the first rank and at least another rank for the first frequency of interest of at least another message at a time earlier than the first time to determine a first average rank, determining an average of the second rank and at least another rank for the second frequency of interest of at least another message at a time earlier than the first time to determine a second average rank, and combining the first average rank and the second average rank with the set of ranks to create the combined set of ranks.

9. An apparatus as defined in claim 8, wherein comparing the combined set of ranks to the reference set of ranks includes determining a set of distances between the combined set of ranks and one or more of the sequences in the reference set of sequences.

10. An apparatus as defined in claim 9, wherein comparator is to determine the data represented by the combined set of ranks by selecting a sequence in the reference set of sequences that has the smallest distance.

11. An apparatus as defined in claim 8, wherein the first rank indicates an amplitude of the first frequency of interest relative to other frequencies in a neighborhood.

12. An apparatus as defined in claim 11, wherein a number of frequencies in the neighborhood is equal to a number of possible rank values.

13. An apparatus as defined in claim 8, further comprising a stacker to determine a first average rank for a first frequency in the frequency domain representation and to determine a second average rank for a second frequency in the frequency domain representation.

14. An apparatus as defined in claim 13, wherein the information is encoded in the media content signal after T seconds and wherein determining a first average rank for the first frequency comprises determining a third rank for a first frequency approximately T seconds before determining the first rank and adding the first rank and the third rank.

15. A machine readable medium storing instructions that, when executed, cause a machine to extract information from media content by at least:
　receiving a media content signal;
　sampling the media content signal to generate digital samples;
　determining a frequency domain representation of the digital samples;
　determining a first rank of a first frequency in the frequency domain representation;
　determining a second rank of a second frequency in the frequency domain representation;
　combining the first rank and the second rank with a set of ranks to create a combined set of ranks;
　comparing the combined set of ranks to a set of reference sequences;
　determining information represented by the combined set of ranks based on the comparison; and
　storing the data in a tangible memory;
　wherein the first rank and the second rank are associated with a first message at a first time; and
　wherein combining the first rank and the second rank with the set of ranks to create the combined set of ranks includes determining an average of the first rank and at least another rank for the first frequency of interest of at least another message at a time earlier than the first time to determine a first average rank, determining an average of the second rank and at least another rank for the second frequency of interest of at least another message at a time earlier than the first time to determine a second average rank, combining the first average rank and the second average rank with the set of ranks to create the combined set of ranks.

16. A machine readable medium as defined in claim 15, wherein comparing the combined set of ranks to the reference set of ranks includes determining a set of distances between the combined set of ranks and one or more of the sequences in the reference set of sequences.

17. A machine readable medium as defined in claim 16, wherein determining the data represented by the combined set of ranks includes selecting a sequence in the reference set of sequences that has the smallest distance.

18. A machine readable medium as defined in claim 15, wherein the first rank indicates an amplitude of the first frequency of interest relative to other frequencies in a neighborhood.

19. A machine readable medium as defined in claim 18, wherein a number of frequencies in the neighborhood is equal to a number of possible rank values.

20. A machine readable medium as defined in claim 15, further comprising determining a first average rank for a first frequency in the frequency domain representation and determining a second average rank for a second frequency in the frequency domain representation.

21. A machine readable medium as defined in claim 20, wherein the information is encoded in the media content signal after T seconds and wherein determining a first average rank for the first frequency comprises determining a third rank for a first frequency approximately T seconds before determining the first rank and adding the first rank and the third rank.

* * * * *

UNITED STATES PATENT AND TRADEMARK OFFICE
CERTIFICATE OF CORRECTION

PATENT NO. : 8,121,830 B2
APPLICATION NO. : 12/604176
DATED : February 21, 2012
INVENTOR(S) : Venugopal Srinivasan et al.

Page 1 of 2

It is certified that error appears in the above-identified patent and that said Letters Patent is hereby corrected as shown below:

In the Claims:

Column 14, line 19:
  Replace "data represented" with --information represented--.
Column 14, line 29:
  Replace "a first average rank for a" with --the first average rank for the--.
Column 14, line 30:
  Replace "a second" with --the second--.
Column 14, line 31:
  Replace "a second" with --the second--.
Column 14, line 35:
  Replace "determining a first" with --determining the first--.
Column 14, line 36:
  Replace "for a first" with --for the first--.
Column 14, line 55:
  Replace "the data" with --the information--.
Column 15, line 12:
  Replace "the data" with --the information--.
Column 15, line 22:
  Replace "a first average rank for a" with --the first average rank for the--.
Column 15, line 23:
  Replace "to determine a" with --to determine the--.
Column 15, line 24:
  Replace "for a second" with --for the second--.
Column 15, line 28:
  Replace "determining a first" with --determining the first--.
Column 15, line 29:
  Replace "for a first" with --for the first--.

Signed and Sealed this
Second Day of September, 2014

Michelle K. Lee
*Deputy Director of the United States Patent and Trademark Office*

CERTIFICATE OF CORRECTION (continued)
U.S. Pat. No. 8,121,830 B2

In the Claims:

Column 16, line 3:
    Replace "the data" with --the information--.
Column 16, line 24:
    Replace "the data" with --the information--.
Column 16, line 35:
    Replace "a first average rank for a" with --the first average rank for the--.
Column 16, line 37:
    Replace "a second average rank for a" with --the second average rank for the--.
Column 16, line 41:
    Replace "a first" with --the first--.
Column 16, line 43:
    Replace "a first" with --the first--.